United States Patent [19]
Wild

[11] 4,134,116
[45] Jan. 9, 1979

[54] MONITORING COMMUTATED SCANNING RADIO BEAMS

[76] Inventor: John P. Wild, 3 Strathfield Ave., Strathfield, New South Wales, Australia

[21] Appl. No.: 796,791

[22] Filed: May 13, 1977

[30] Foreign Application Priority Data

May 13, 1976 [AU] Australia ............................ 5926/76

[51] Int. Cl.[2] ............................................ G01S 1/12
[52] U.S. Cl. ........................ 343/100 AP; 343/108 M; 343/703
[58] Field of Search ........ 343/703, 760, 894, 100 AD, 343/100 AP, 17.7, 108 M; 325/67

[56] References Cited

U.S. PATENT DOCUMENTS

| | | | |
|---|---|---|---|
| 3,164,835 | 1/1965 | Alsberg | 343/894 |
| 3,378,846 | 4/1968 | Lowenschuss | 343/703 |
| 3,490,021 | 1/1970 | Hogg et al. | 343/703 |
| 3,818,476 | 6/1974 | Coulter et al. | 343/100 AP |

*Primary Examiner*—Maynard R. Wilbur
*Assistant Examiner*—Lawrence Goodwin
*Attorney, Agent, or Firm*—Sughrue, Rothwell, Mion, Zinn and Macpeak

[57] ABSTRACT

Determination of the pointing accuracy of a commutated scanning beam aerial is effected by monitoring the phase of the signal received at a point where, at all times during its operation, a field is established by the aerial. The phase of the sampled signal is observed by comparing it with a second signal which is sampled elsewhere in the field region or which is derived from the RF signal source of the aerial. This comparison can be effected by heterodyning the two signals. Pointing accuracy is determined by comparing the signal produced by the heterodyning with a pre-recorded signal typifying that experienced when the pointing error is zero. The technique is applicable to commutated torus aerials and to aerials incorporating a linear array of radiators to which power is supplied from a commutated array of excitation elements via an electromagnetic lens.

12 Claims, 8 Drawing Figures

MONITORING COMMUTATED SCANNING RADIO BEAMS

This invention concerns the monitoring of the accuracy of commutated scanning radio beams. Aerials which produce scanning radio beams by a commutative process are known. Examples of such aerials are those using a parallel plate electromagnetic lens fed by a commutated array of excitation elements, such as the aerials described in the specification of Australian patent applications Nos. 14777/76, 20002/76 and 20708/76 (the last two corresponding, respectively, to U.S. patent applications Ser. Nos. 745,701 and 753,383, filed on Nov. 29, 1976 and Dec. 22, 1976), and the torus aerial described in the specification of Australian Pat. No. 469,466 (corresponding to U.S. Pat. No. 3,878,523).

If such aerials are to be incorporated into precision approach and landing guidance systems for aircraft, the accuracy of the scanning beams generated by the aerial must be monitored. The prime objective of the present invention is the provision of such monitoring.

The system of monitoring which constitutes the present invention uses the fact that when aerials of the type described above are operating, there is in each case a region in which there is always a field established by the aerial. Within this region, the phase distribution of the field varies continuously with time during the scan cycle, but is completely determined by the geometry of the lens or mirror for each instantaneous angle of scan of the beam radiated by the aerial. By (a) noting the variation with time of the phase at a single point in the region relative to the phase of a reference signal, and (b) comparing this variation with that expected if the modulation and switching of the commutation system is being performed accurately, the angular position of the radio beam at each instant in the scan cycle can be uniquely determined. Sampling the region at a single point is therefore sufficient to monitor the directional accuracy of the radiated beam throughout its scan range.

According to the present invention, a technique for monitoring the accuracy of a commutated scanning beam aerial comprises the steps of:

(a) determining the variation with time of the phase difference between a first signal sampled at a point in a region where the field established by the aerial exists at all times during excitation of the aerial and a second signal; and (b) observing the occurrence of at least one specific phase difference between the first and second signals which typifies a predetermined position of the scanning beam.

The second signal may be a signal sampled at another point in the region of established field, or it may be a signal derived from the source of signal used for exciting the scanning beam aerial. In either case, the difference in phase between the signals may conveniently be obtained by heterodyning the signals to provide a low frequency beat signal. This low frequency signal can be compared with a pre-recorded signal accurately synchronised to the control clock of the commutated array to provide information about the scan timing, and hence the pointing accuracy, of the aerial.

In the following description, which discusses theoretical and practical considerations associated with the present invention, reference will be made to the accompanying drawings, in which.

Figure 1:
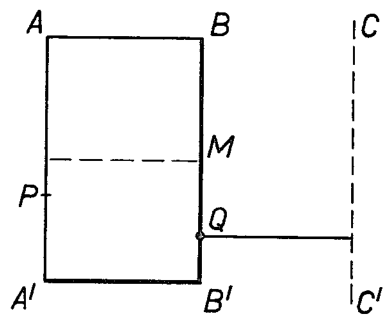
FIG. 1 is a symbolic representation of an electromagnetic lens connected to a linear array of radiating elements.

In FIG. 1, ABB'A' represents an electromagnetic lens having an array of input probes located along edge AA' and an array of output probes along edge BB'. If the lens is of the type described in the specification of Australian patent application No. 20708/76, the output probes are connected to respective radiating elements (for example, column radiators) in the linear array CC'. The input probes are connected to the output of a commutated RF feed system (not shown). The lens performs the Fourier transform of the field distribution along AA'.

Suppose a single input probe at point P on AA' is energised. Since the lens is constructed to be stable and reliable, the phase distribution along BB' is completely determined by the geometry of the lens. Thus, if the position of point P is known, the entire phase distribution along BB' is known and the direction in which the radio beam is radiated from the linear array CC' is also known. Conversely, if the phase distribution along BB' is known, the position of P may be inferred. Alternatively, the phase at a single point Q on BB' may be monitored as a function of time during the scan cycle. From this information, the instantaneous position of P, and hence the direction in which the beam is radiated from the linear array CC', can be unambiguously determined.

Almost invariably, the operation of scanning beam aerials of this type requires more than one input probe on AA' to be excited at any given time, and P is thus not a single point but a small region in which a plurality of probes are actuated in accordance with the modulation of the feed system. The present invention is nevertheless equally applicable to this practical multiple-source distribution, for the field sampled at Q is the vector sum of the fields received from the "region" P, and the phase of the sampled signal is uniquely associated with a particular beam direction.

In practice, the phase of the sampled signal is determined with reference to a second signal of the same frequency, which may be obtained from any convenient point in the system. The second signal could be obtained, for example, by sampling the output of the signal source for the aerial system. Normally, however, it will be obtained by sampling the field at a second point along BB'. Conveniently, the second signal can be obtained by sampling the field at the mid-point M of BB'. Another way in which the present invention can be applied to the lens system symbolically illustrated in FIG. 1, is by sampling the field at two widely separated points, preferably symmetrically located about the mid-point M (for example, at the ends B and B'), to provide the first and second signals of the invention.

In any of these alternative practices of the present invention, if the two sampled signals are heterodyned, the resultant is a low-frequency beat signal which may be compared with a pre-recorded signal accurately synchronised to the control clock of the commutation switching system of the aerial. Any suitable comparison technique may be used. For example, the low-frequency beat signal and the prerecorded signal could be applied to the X and Y plates of a cathode ray tube. With no error in the rate of scanning, a steady 45° line will be observed. If an error exists in one direction, the line will open out into an ellipse. Measurement of the eccentricity of the ellipse is a direct measurement of beam-pointing error. In practical implementation, however, a cathode ray tube will not normally be used for the beam-pointing error can be measured directly by known comparison circuits.

Figure 2:
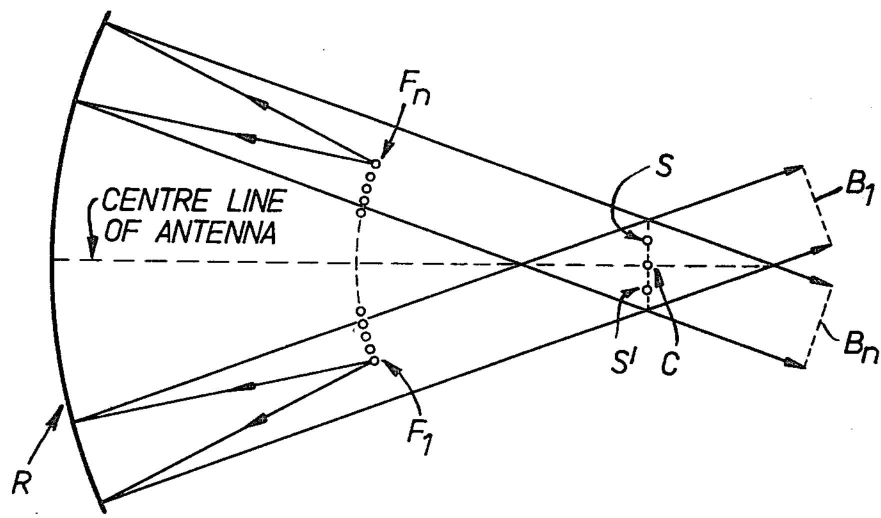
FIG. 2 is a schematic plan view of a torus azimuth antenna.

As already noted, the present invention is not restricted in its application to aerials incorporating an electromagnetic lens. FIG. 2 illustrates how it may be applied to a torus antenna. The torus antenna illustrated in FIG. 2 comprises a series of commutatively actuated microwave feed elements $F_1 \ldots F_n$, each positioned at approximately the half-radius of curvature of the cylindrical microwave reflector R. Each feed element is so positioned that the beam of radiation it produces when activated is directed to a respective portion of the reflector R, from which it is reflected into space as a beam of radiation. (The reflected beam is collimated if the illuminated surface of reflector R approximates to a parabola). Feed element $F_1$ in FIG. 2 thus produces beam $B_1$, while the other extreme beam of the scan from the aerial system is $B_n$, produced on activation of feed element $F_n$. Such antenna systems have been widely described in the relevant technical literature during the last five years. In addition to the specification of Australian Pat. No. 469,466 and corresponding U.S. Pat. No. 3,878,523, a recent description of such a torus antenna will be found in the papers entitled "The Interscan System" and "Interscan Quasi-Continuous Electronic Scanning" presented, respectively, by H. C. Minnett and by D. N. Cooper, B. F. C. Cooper and J. W. Brooks, to the IREE International Electronics Convention, Aug. 1975. (The papers appear, respectively, in pages 238–240 and 244–246 of the published "Convention Digest").

Reverting to FIG. 2, the region in which a signal (or signals) may be sampled at all times during operation of the antenna is in the neighbourhood of the centre of curvature C of the reflector surface R. When the feed elements $F_1 \ldots F_n$ are excited, the wavefronts of the collimated beams $B_1 \ldots B_n$ produced by the reflector R all pass through this region. Typically the or each sampling point will lie on a line through C, normal to the axis of symmetry and also normal to the centre line of the aerial. However, it is not essential for the or each sampling point to lie precisely on this line. When there are two sample points (S,S′), as in the last alternative technique described above for a lens aerial system, the points should be as far apart as possible provided they intercept all reflected wavefronts, and preferably they should be located symmetrically about C.

The processing of sampled signals is carried out precisely as described above for the case of signals sampled from an antenna system incorporating an electromagnetic lens.

As will be shown later in this specification, the technique of the present invention allows the power output from each input probe or feed element, as well as the aerial pointing accuracy, to be monitored. However, if it is felt necessary or desirable, the variation during the scan cycle of the power at the lens output may also be monitored (for example, using a simple power-sampling probe mounted at the mid-point M in the case of a commutated lens aerial as illustrated in FIG. 1 and at the centre of curvature C in the torus aerial of FIG. 2) to ensure that all exciter elements are producing the power necessary for correct operation of the aerial system. It may be noted, incidentally, that any fault that occurs to the right of the lens output BB′ (in FIG. 1) degrades the system gracefully.

Figure 3:
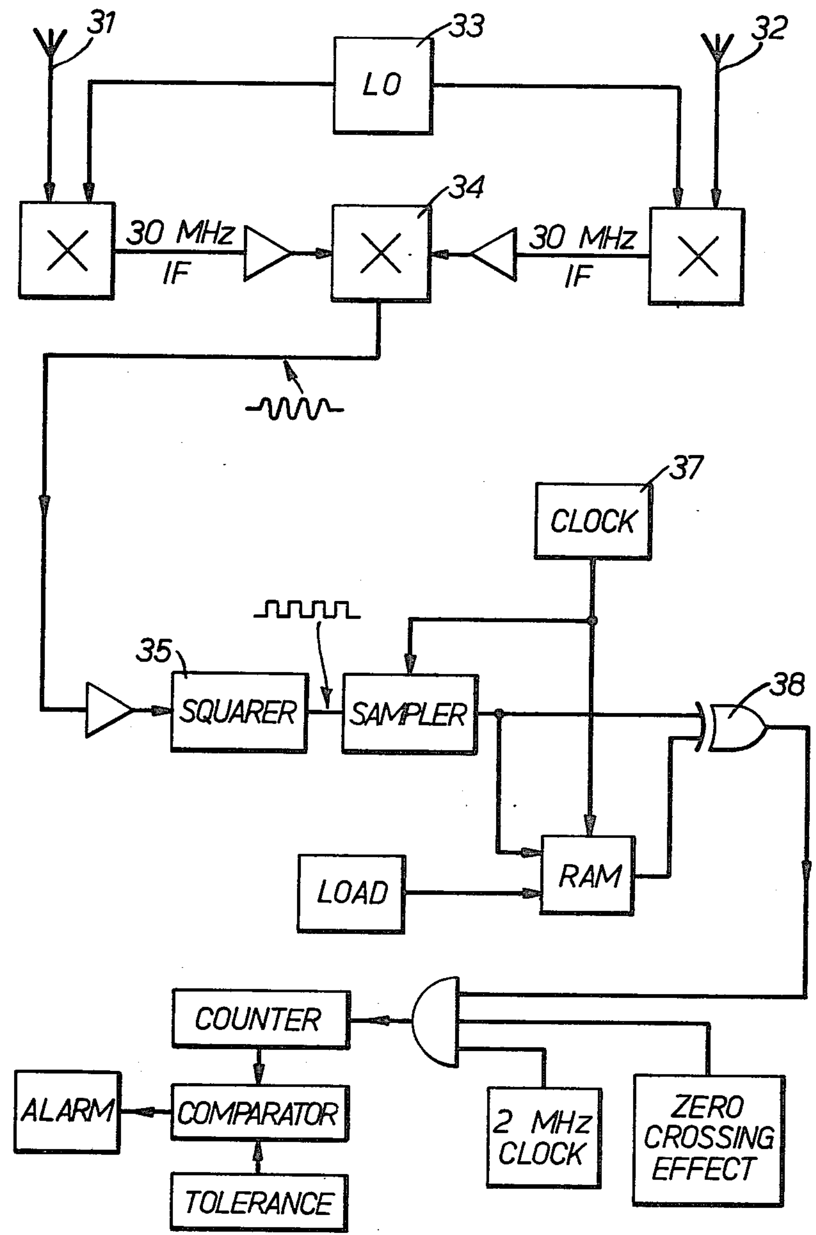
FIG. 3 is a block diagram of a circuit used to demonstrate the present invention.

As a practical demonstration of the applicability of the present invention to torus antenna monitoring, two dipoles were mounted symmetrically on a line passing through the centre of curvature of an azimuth 'torus' scanning beam aerial installed at Melbourne Airport, normal to the antenna boresight, and at the median height of the antenna panels. The reflector of the torus antenna had a radius of curvature of approximately 4.62 meters. The dipole arrangement and its associated circuitry is illustrated in FIG. 3.

The C-band signals picked up by the dipoles 31, 32 are each mixed with signals from oscillator 33 to provide a beat signal of about 30 MHz. These beat signals are amplified and multiplied together in multiplier 34, producing a characteristic sinusoidal "fringe" pattern as the beam swings through the coverage sector. This sinusoidal signal is squared (in squarer 35). Sample frames of the squared-up waveform under conditions of correct adjustment of the antenna are stored in the random access memory RAM. The clocking for sampler 36 and memory RAM is synchronised with the central commutation clock 37, which controls the sequential actuation of the feed elements of the aerial. The stored and sampled squared-up signals are then compared using a logic circuit incorporating an exclusive-OR gate, 38, which reveals any timing discrepancies in the zero crossings of the squared waveforms. The zero crossings of the fringe pattern when timed relative to the central commutation clock give a sensitive measure of the beam pointing accuracy over the entire sector.

The subsequent monitoring equipment enables the timing errors at all zero crossings to be measured over each "to" and "fro" scan of the antenna, and a suitable threshold to be set for the beam pointing accuracy beyond which an alarm flag is operated.

To investigate various effects, the spacing of dipoles 31, 32 was varied over the range 8 to 33 wavelengths and at each spacing good fringe patterns were observed. A spacing of 33 wavelengths was found to give about 1.5 crossings per beamwidth or 1.3 crossings per feed element spacing (0.85°). At larger dipole spacings, more crossings are possible, but the dipole signals weaken as the edges of the beams are approached.

Cathode ray oscillograph traces showing the sinusoidal fringe pattern (upper trace) and the squared-up pattern (lower trace) in specific instances are produced in FIGS. 4*a* to 4*e*.

Figure 4A:
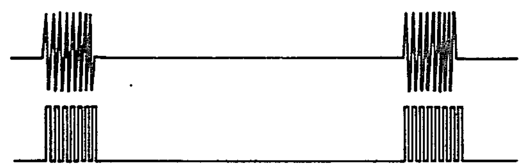
FIGS. 4*a* to 4*e* are oscillograph traces obtained when using the system of FIG. 3.
Figure 4B:
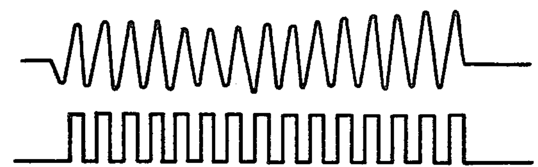
Figure 4C:
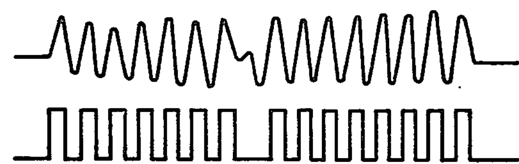
Figure 4D:
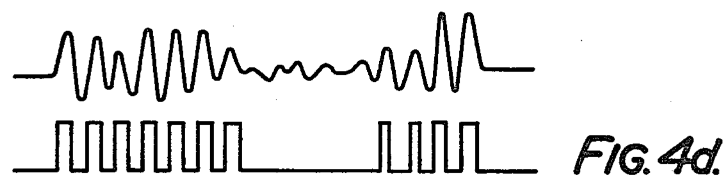
Figure 4E:
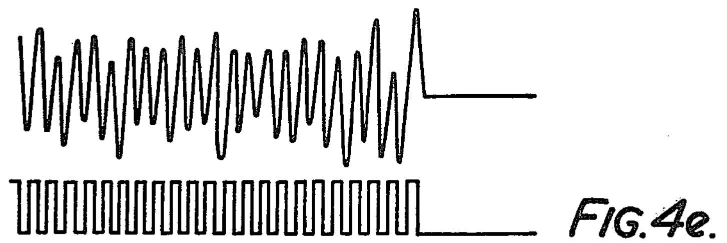

FIG. 4*a* shows the "to" and "fro" patterns produced with a dipole spacing of 33 wavelengths (approximately 2 meters). FIG. 4*b* is an expanded version of one of these patterns. Approximately 15 fringes are visible with 30 zero crossings corresponding to the 1° beam of the antenna being scanned through approximately 20°. The effect of an inactive port near the centre of coverage, with the same dipole spacing, is shown in FIG. 4*c*. It was found that a feed amplitude error of about 1 dB, producing a pointing error of 0.025°, resulted in a perturbation of the zero crossings in the appropriate directions which was readily detectable using the monitoring equipment described below. The gross effect of a person between the feed and reflector, again at the same dipole spacing, is indicated in FIG. 4*d*. FIG. 4*e* shows a pattern obtained in a preliminary experiment at a spacing of about 50 wavelengths.

By performing a series of experiments with the arrangement of FIG. 3, it was found that errors of 1 dB in the amplitude of excitation of any single feed could be readily monitored (errors of 0.5 dB being within reach with more carefully constructed and stabilised monitor circuits) and the phase sensitivity was such that the alarm could be tripped by mechanical displacements of the receiving antennae or reflector panels of about 1 mm.

Although the monitoring has been described in this specification in the applicability to scanning beam aerials used in approach and landing guidance systems for aircraft, it will be clear to those skilled in the art that the present invention is also applicable to scanning beam aerials used for other purposes, where the pointing accuracy of the aerial has to be monitored.

I claim:

1. A method of monitoring the beam pointing accuracy of a commutated scanning beam aerial, characterized in that the scanning beam is generated by sequential connection of aerial feed elements to a radio frequency source, comprising the steps of:

(a) determining the variation with time of the phase difference between a first signal sampled at a point in a region where the field exists at all time due to excitation of the feed elements of the aerial and a second signal; and (b) observing the occurrence of at least one specific phase difference between the first and second signals which typifies a predetermined position of the scanning beam.

2. A monitoring method as defined in claim 1, in which the step of observing the occurrence of at least one phase difference is effected by comparing a signal indicative of the observed phase difference between the said first and second signals with a signal indicative of the phase difference between the said first and second signals that is experienced when the aerial is operating with zero pointing error.

3. A monitoring method as defined in claim 2, in which the signal indicative of the observed phase difference between said first and second signals is obtained by heterodyning the said first and second signals to provide a low-frequency beat signal, and said comparison is between this low-frequency beat signal and a pre-recorded similar low-frequency signal indicative of the phase difference between said first and second signals when the aerial is operating with zero pointing error, accurately synchronised to the commutation clock of the aerial.

4. A monitoring method as defined in claim 3, in which the pre-recorded signal is stored in a random access memory and is compared with the low-frequency beat signal using an exclusive-OR gate technique.

5. A monitoring method as defined in claim 4, in which the low-frequency beat signal and the pre-recorded signal are converted to squared waveforms, said comparison being a comparison of the timing of the cross-overs of the square waveforms.

6. A monitoring method as defined in claim 5, in which an alarm is operated if a preset tolerance between the cross-over times of the square waveforms is exceeded.

7. A monitoring method as defined in claim 1, in which the second signal is also sampled in the region where the field established by the aerial exists at all times during its excitation.

8. A monitoring method as defined in claim 7, in which the first and second signals are sampled at points widely separated within said region of field.

9. A monitoring method as defined in claim 1, in which the second signal is derived from the source of signal used for exciting the aerial.

10. A monitoring method as defined in claim 1, in which the commutated scanning beam aerial comprises a linear array of radiators fed with power from a commutated array of excitation elements through an electromagnetic lens.

11. A monitoring method as defined in claim 1, in which the output power level of the aerial is monitored using a single probe mounted centrally within the region where a field exists at all times during excitation of the aerial.

12. A monitoring method as defined in claim 1, in which the commutated scanning beam aerial is a torus aerial.

* * * * *